US008725001B2

(12) United States Patent
Fini et al.

(10) Patent No.: US 8,725,001 B2
(45) Date of Patent: May 13, 2014

(54) MULTICORE FIBER TRANSMISSION SYSTEMS AND METHODS

(75) Inventors: John M. Fini, Jersey City, NJ (US); Thierry F. Taunay, Bridgewater, NJ (US); Man F. Yan, Berkeley Heights, NJ (US); Benyuan Zhu, Princeton, NJ (US)

(73) Assignee: OFS Fitel, LLC, Norcross, GA (US)

( * ) Notice: Subject to any disclaimer, the term of this patent is extended or adjusted under 35 U.S.C. 154(b) by 406 days.

(21) Appl. No.: 13/044,859

(22) Filed: Mar. 10, 2011

(65) Prior Publication Data

US 2011/0274435 A1    Nov. 10, 2011

Related U.S. Application Data

(60) Provisional application No. 61/312,497, filed on Mar. 10, 2010, provisional application No. 61/314,183, filed on Mar. 16, 2010.

(51) Int. Cl.
*G02B 6/42* (2006.01)
*H04J 14/00* (2006.01)

(52) U.S. Cl.
USPC .............................. 398/145; 398/66; 398/142

(58) Field of Classification Search
USPC ................................................. 398/142, 145
See application file for complete search history.

(56) References Cited

U.S. PATENT DOCUMENTS

| | | | | |
|---|---|---|---|---|
| 5,379,357 | A | * | 1/1995 | Sentsui et al. ................ 385/11 |
| 5,448,661 | A | * | 9/1995 | Takai et al. ................... 385/24 |
| 5,566,196 | A | * | 10/1996 | Scifres ............................ 372/6 |
| 7,548,674 | B1 | | 6/2009 | Horibe et al. |
| 7,654,751 | B2 | * | 2/2010 | Althaus et al. ................ 385/89 |
| 2002/0105715 | A1 | | 8/2002 | Naito et al. |
| 2002/0118908 | A1 | * | 8/2002 | Conde et al. .................. 385/14 |
| 2010/0278486 | A1 | * | 11/2010 | Holland et al. ............... 385/43 |
| 2011/0129231 | A1 | * | 6/2011 | Fiorentino et al. .......... 398/141 |
| 2012/0008658 | A1 | * | 1/2012 | Chung ...................... 372/45.01 |

FOREIGN PATENT DOCUMENTS

| | | | | |
|---|---|---|---|---|
| JP | 2058006 | A | 2/1990 | |
| JP | 9005581 | A | 1/1997 | |
| JP | 10125988 | A | 5/1998 | |
| JP | 2009-20347 | | * 1/2009 | ............... G02B 6/42 |
| JP | 2009020347 | A | 1/2009 | |

OTHER PUBLICATIONS

Romaniuk R S et al: "Multicore Optical Fiber Components", Proceedings of SPIE, SPIE, USA, vol. 722, Sep. 22, 1986, pp. 117-124, XP000198335, ISSN: 0277-786X.

* cited by examiner

*Primary Examiner* — Nathan Curs
(74) *Attorney, Agent, or Firm* — Law Offices of Jacobs & Kim (57) ABSTRACT

An optical data link includes first and second pluralities of transmission devices, at least one of which is configured as an array. A multichannel transmission link has a first end connected to the first plurality of transmission devices and a second end connected to the second plurality of transmission devices so as to form a plurality of parallel transmission channels therebetween. The multichannel transmission link includes a multicore fiber with a plurality of individual cores having a configuration matching the array configuration of the at least one plurality of transmission devices. The multicore fiber has an endface connected directly to the at least one plurality of transmission devices, with the individual cores of the multicore fiber aligned with respective devices in the at least one plurality of transmission devices. Further described are access networks and core networks incorporating a transmission link comprising at least one span of a multicore fiber.

7 Claims, 8 Drawing Sheets

MULTICORE FIBER TRANSMISSION SYSTEMS AND METHODS

CROSS REFERENCE TO RELATED APPLICATIONS

The present application claims the priority benefit of the following United States provisional patent application, which is owned by the assignee of the present application, and which is incorporated herein by reference in its entirety:

U.S. Prov. Pat. App. Ser. No. 61/314,183, filed on Mar. 16, 2010; and

U.S. Prov. Pat. App. Ser. No. 61/312,497, filed on Mar. 10, 2010.

BACKGROUND OF THE INVENTION

1. Field of the Invention

The present invention relates generally to multicore fiber transmission systems and methods.

2. Background Art

Figure 1:
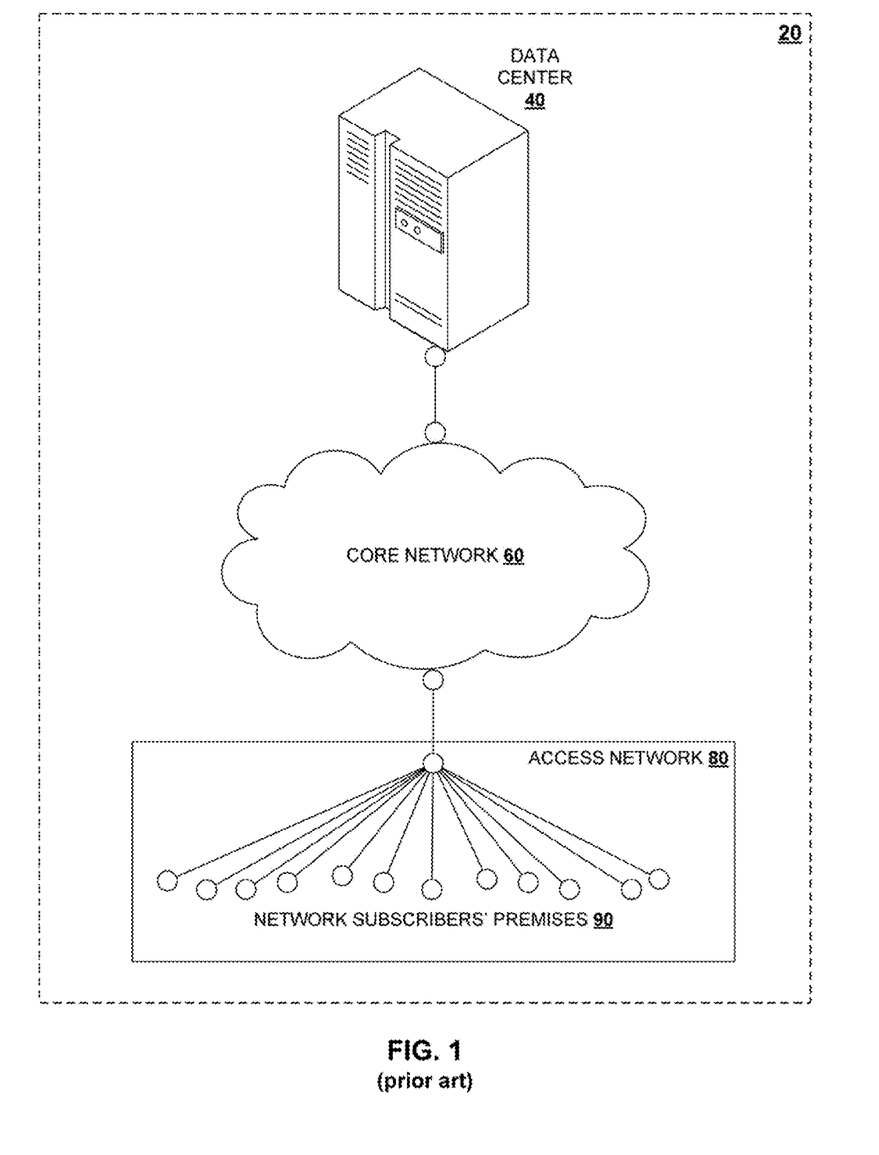
FIG. 1 shows a simplified diagram of an exemplary optical network architecture according to the prior art.

Rapid and global increasing of internet services has been accelerating the needs for large-capacity optical fiber communications. FIG. 1 shows a simplified diagram of an exemplary optical network architecture 20 according to the prior art. The network architecture includes a data center 40 that transmits and receives data over a core network 60. An access network 80 is connected into the core network 60, and is used to transmit data to, and receive data from, network subscribers' premises 90.

Figure 2:
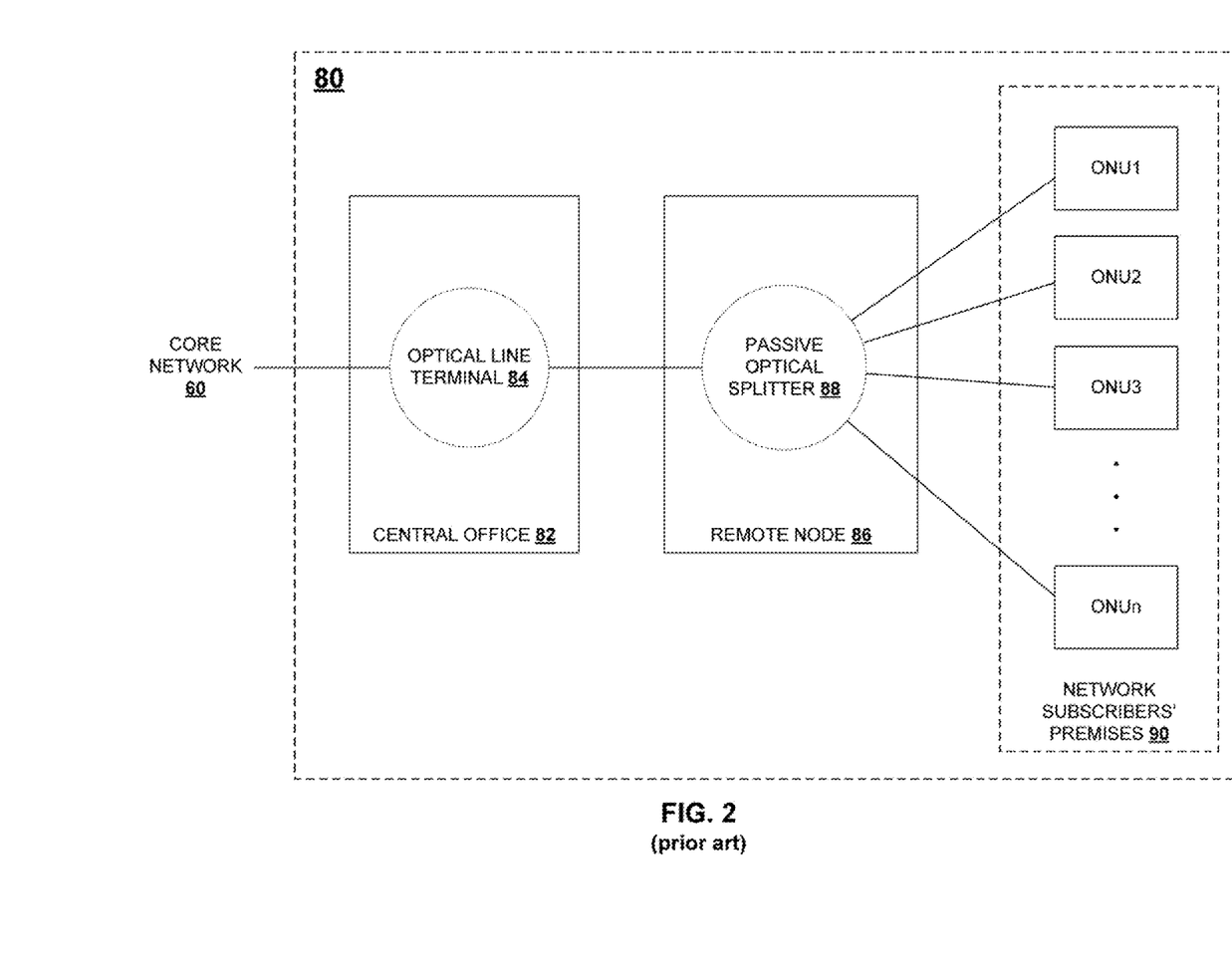
FIG. 2 is a simplified diagram of an exemplary architecture of an access network according to the prior art.

FIG. 2 is a simplified diagram of an exemplary architecture for access network 80. Data from core network 60 is received by central office (CO) 82 at an optical line terminal (OLT) 84. The data is then forwarded to a remote node (RN) 86, wherein a passive optical splitter 88 is used to distribute the data to a plurality of optical network units ONU1 ... ONUn located at network subscribers' premises 90 (FIG. 1). Each ONUn sends its signal to passive optical combiner 88 and be received at OLT 84, then those signals will be sent to core network.

Recent information-theoretic studies have shown that capacity per fiber has reached the limiting point in optical networks. Thus, there is considerable interest in the design and development of network components employing multicore fiber (MCF) to increase the capacity per fiber. Critical issues that will have a significant impact on the system performance and cost-effectiveness of MCF in practical applications include: (1) the development of structures and techniques for coupling individual signals from transceivers into and out of an MCF; (2) design and demonstration of efficient MCF which allows signal transport within each core with low loss and low crosstalk over long length; and (3) the development of MCF transmission systems that are capable of using commercially available components as transceivers at low cost with high cable density.

SUMMARY OF THE INVENTION

A first aspect of the invention is directed to an optical data link, in which there are first and second pluralities of transmission devices, at least one of which is configured as an array. A multichannel transmission link has a first end connected to the first plurality of transmission devices and a second end connected to the second plurality of transmission devices so as to form a plurality of parallel transmission channels therebetween. The multichannel transmission link includes a multicore fiber with a plurality of individual cores with core-to-core spacing significantly smaller than current multi-fiber or ribbon arrangements, and having a configuration matching the array configuration of the at least one plurality of transmission devices. The multicore fiber has an endface connected directly to the at least one plurality of transmission devices, with the individual cores of the multicore fiber aligned with respective devices in the at least one plurality of transmission devices. According to a further aspect of the invention, the multichannel transmission link includes a tapered multicore coupler for connecting the multicore fiber to the at least one plurality of transmission devices.

A further aspect of the invention is directed to an access network including a plurality of passive optical network transceivers, a plurality of optical splitters, and a multichannel transmission link having a first end connected to the plurality of passive optical network transceivers and a second end connected to the plurality of optical splitters to form a plurality of parallel transmission channels therebetween. The multichannel transmission link comprises at least one span of a multicore fiber with a plurality of individual cores.

The multichannel transmission link is connected to the plurality of optical splitters by means of a tapered multicore coupler comprising a plurality of individual fibers having respective first ends joined together at a tapered coupler body. The cores of the individual fibers extend through the tapered coupler body, terminating at an endface having a core configuration matching the configuration of the individual cores of a multicore fiber span at an end of the transmission link. The coupler endface is connected to the multicore fiber, and the individual fibers have respective ends connected to respective splitters in the plurality of optical splitters.

Another aspect of the invention is directed to an optical core network, comprising first and second pluralities of transmission devices and a multichannel transmission link having a first end connected to the first plurality of transmission devices and a second end connected to the second plurality of transmission devices so as to form a plurality of parallel transmission channels between the first and second pluralities of transmission devices.

The multichannel transmission link comprises at least one span of a multicore fiber with a plurality of individual cores. At least one of the first and second pluralities of transmission devices is connected to an end of the multicore fiber by means of a tapered multicore coupler comprising a plurality of individual fibers having respective first ends joined together at a tapered coupler body. The cores of the individual fibers extend through the tapered coupler body, terminating at an endface having a core configuration matching the configuration of the individual cores of the multicore fiber. The coupler endface is connected to the multicore fiber; the individual fibers have respective ends connected to respective devices in the at least one of the first and second pluralities of transmission devices.

The above aspects of the invention, as well as the advantages thereof, are discussed in detail below.

DETAILED DESCRIPTION

Aspects of the invention are directed to structures and techniques for use in MCF transmission applications in the areas of (1) high performance super-computers and data centers, (2) core networks, and (3) optical access networks.

There are significant differences in the system requirements and transceiver technologies for applications in these three contexts. Hence, the structures and techniques used to provide connectivity between individual transceivers and MCF will be different.

The present description is organized as follows:
1. Data Centers
2. Core Networks
3. Optical Access Networks
4. Summary
5. Conclusion

1. HIGH-PERFORMANCE SUPER-COMPUTERS AND DATA CENTERS

Data centers and high-performance computing environments typically include thousands, or tens of thousands, of optical links. The longest of these optical links typically has a length of less than 100 m. The key requirements for ensuring successful deployment of these high-speed parallel optical data links are low cost, high density and low power consumption.

Prior approaches have focused on one-dimensional parallel optical data links, utilizing multimode fiber ribbons with a one-data-channel-per-fiber arrangement. However, such system configurations are costly, complicated and bulky.

Figure 3:
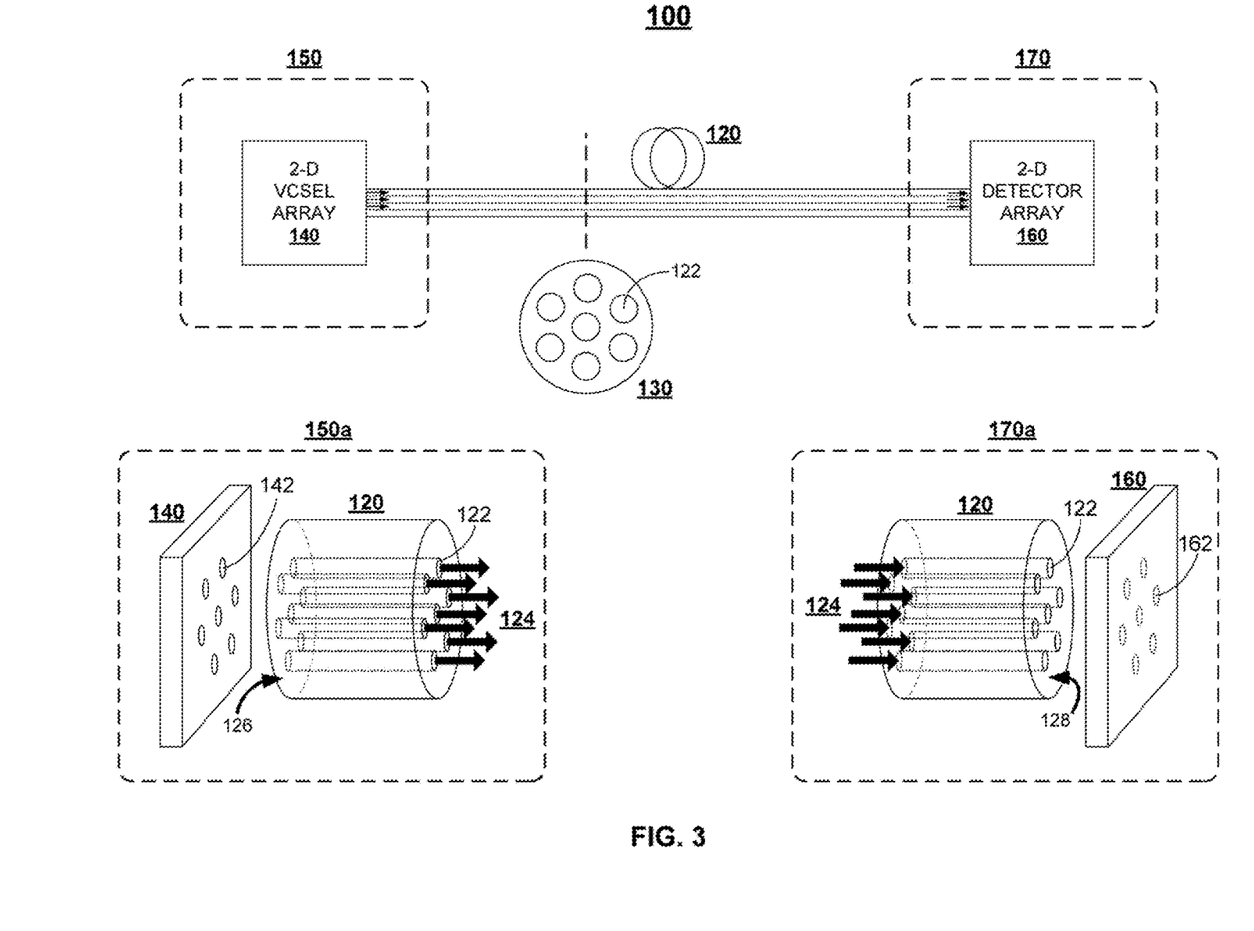
FIG. 3 is a diagram of a system for high-speed optical data transmission according to an aspect of the invention.

FIG. 3 is a diagram of a system 100 for high-speed optical data transmission, in which a multimode multicore fiber (MCF) 120 is used to provide a plurality of high-speed parallel optical data links 124 between an array of transmitters 140 and a corresponding array of receivers 160. In the present example, the array of transmitters 140 is implemented using a two-dimensional (2D) array of vertical-cavity, surface-emitting lasers (VCSELs), silicon photonics devices, or the like, and the array of receivers 160 is implemented using a 2D array of surface normal PiN photodetectors or the like. For the purposes of the present discussion, transmitters, receivers, and the like are generically referred to as "transmission devices."

In the present example, the MCF used to provide the parallel data links is a 7-core graded-index multicore fiber capable of simultaneous transmission of seven channels over 10 s to 100 s of meters of MCF. Such a fiber is described in U.S. Prov. Pat. App. Ser. No. 61/312,497, which is owned by the assignee of the present application, and which is incorporated herein by reference in its entirety. It will be apparent from the present discussion that the described techniques and structures may be implemented using other types of fibers. For example, a single-mode 7-core MCF is described in U.S. Prov. Pat. App. Ser. No. 61/314,183, which is owned by the assignee of the present application, and which is incorporated herein by reference in its entirety.

As shown in inset 130, the seven individual MFC cores 122 are arranged in a hexagonal configuration, with six cores positioned at the vertices of the hexagon, and one core positioned at the center of the hexagon. This arrangement provides for an efficient packing of the cores within the fiber structure, with a suitable distance between adjacent cores.

Other arrangements, such as a rectangular array, may be used, provided that the geometry of the cores matches the geometry of the transmission devices. Also, while an MCF with 7 cores is shown, any number of cores may be configured in an MCF as long as certain critical features of the fiber, couplers and coupling to transmission devices are not compromised. In particular, it is essential that the attenuation of the cores be similar to conventional single-core fiber. This can be accomplished using well-known methods for core fabrication, but also requires that the assembly method not introduce additional attenuation. Also, the crosstalk between and among cores must be managed, placing limits on the core-to-core spacing depending on the distribution of optical field propagating within each core. A further consideration is that the core positions should be maintained with sufficient tolerance that the fibers can be spliced together using conventional methods. This may required that a marker is introduced in the fiber to uniquely identify one or more cores.

Inset 150a shows an enlarged, exploded view of a first end 150 of the transmission link 100, including emitter array 140 and a first end of MCF 120. Inset 170a shows an enlarged, exploded view of a second end The individual devices 142, 162 in the emitter array 140 and the receiver array 160 are arranged in respective two-dimensional (2D) configurations that match the configuration of the MCF cores 122, particularly with respect to core diameter and core pitch. This arrangement allows a first endface 126 of the MCF to be mounted directly onto the transmitter array 140, with the individual MCF cores 122 aligned with respective individual transmitters 142. Similarly, a second endface 128 of the MCF 120 can be mounted directly onto the receiver array 160, with the individual MCF cores 122 aligned with respective individual receivers 162. In this way, there are created a plurality of high-speed optical links.

In the exemplary system 100 depicted in FIG. 3, the array of transmitters comprises a 2D array of VCSELs that is butt-coupled with a first end of the MCF, with each VCSEL in the array aligned with a respective individual MCF core. Each VCSEL can be directly modulated with data signals. The array of receivers 160 comprises a 2D array of surface normal PiN detectors is butt-coupled with a second end of the MCF, with each surface normal PiN detector in the array aligned with a respective individual MCF core.

It will be seen that, using the described arrangement, it is possible to achieve a sevenfold increase in the capacity of the transmission system, compared with systems using single-core fibers. The described arrangement achieves high space density. As the 2-D VCSEL can be fabricated on the wafer level, the manufacturing cost will be decreased dramatically.

In the present example, the 2D VCSEL array may be implemented using commercially available devices, which currently have bandwidths as high as 10 Gb/s and a center-to-center pitch as small as 50 μm. However, the minimum center-to-center pitch in a 2D VCSEL array can be limited by the thermal and electrical crosstalk at a range of 50 μm. Thus, in some situations, it will not be possible to directly match the configuration of the 2D array of VECSELs with the geometrical structures in a given MCF. Also, generally speaking, it is advantageous for the MCF to have the same, or comparable, outer diameters as a conventional single core fiber, i.e., on the order of 125 μm.

Figure 4:
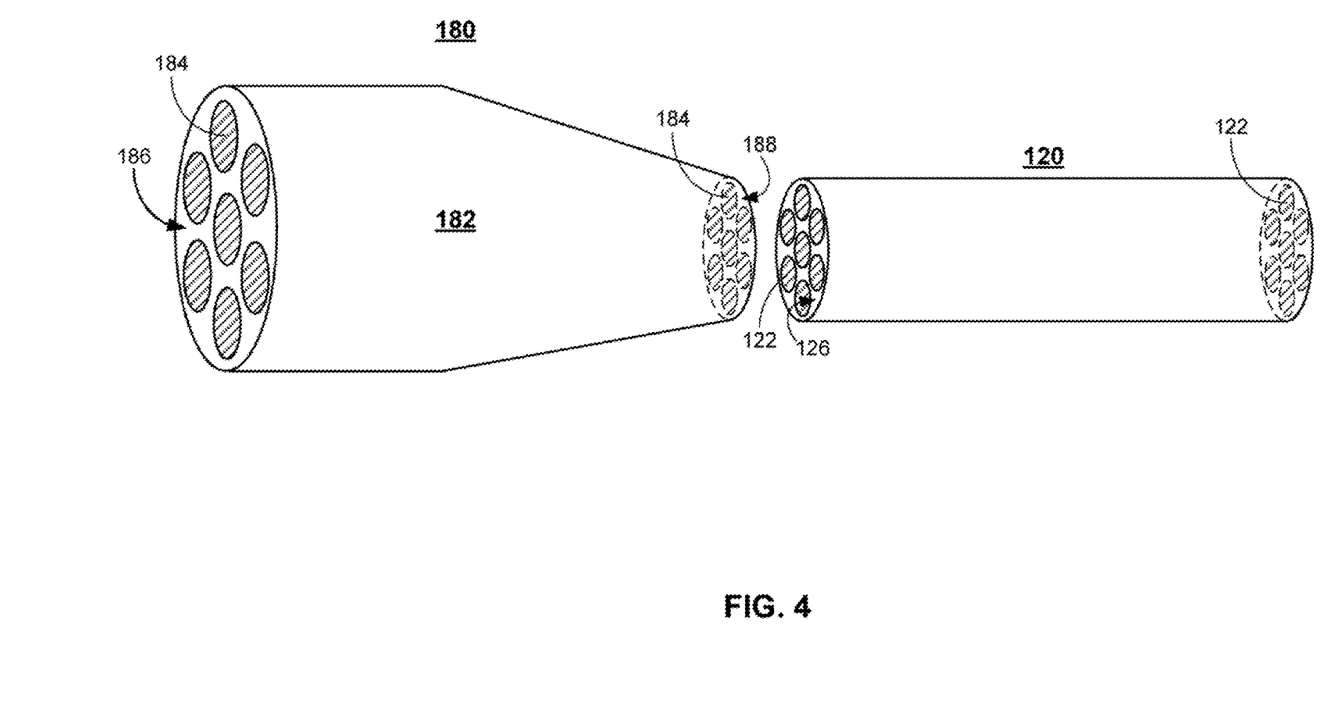
FIG. 4 shows an isometric view of a tapered multicore coupler according to an aspect of the invention.

Accordingly, FIG. 4 shows an isometric view of a tapered multicore coupler 180, according to a further aspect of the invention, for providing connectivity with the transceivers, and like devices, in these and other contexts. As shown in FIG. 2, the tapered multicore coupler 180 comprises a length of an MCF fiber body 182 with a plurality of individual cores 184. The fiber body 182 is adiabatically tapered between a first endface 186 and a second endface 188.

First endface 186 has a size and configuration matching that of an array of VCSELs, or like transmitter devices. This arrangement allows the first endface to be directly mounted onto the array of VCSELs, using a butt-coupling technique or the like, with the coupler fiber's individual cores 184 aligned with respective devices in the array of transmitters.

Second endface 188 has a size and core configuration matching that of an MCF 120 having the same outer diameter as a conventional single core fiber. Thus, the coupler's second endface 188 can be spliced to MCF endface 126, with the coupler's individual cores 184 aligned with respective MCF cores 122. Low-loss splicing between the coupler 180 and the MCF 120 can be achieved using a commercially available polarization-maintaining splicer, which has orientation control. Alternatively, a splicer with orientation monitoring and control optimized for multicore fiber could be used for improved splicing.

Figure 5:
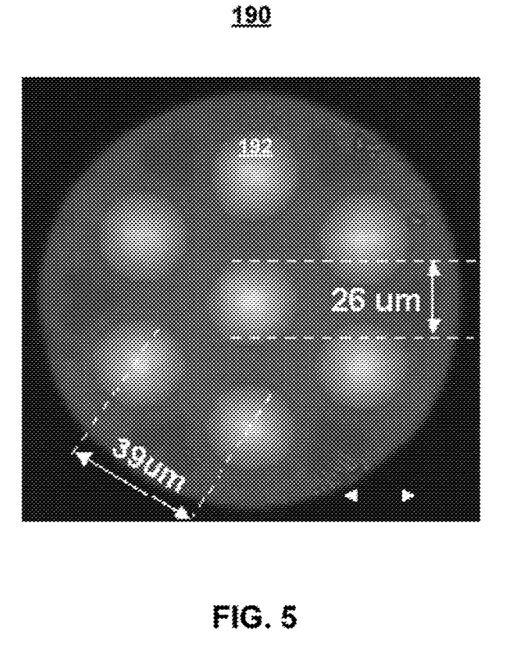
FIG. 5 shows an image of an endface of a graded-index multicore fiber according to an aspect of the invention.

FIG. 5 shows an image of an endface 190 of the above-described graded-index MCF, illustrating its structure. In the depicted example, the MCF comprises seven individual cores 192 arranged in a hexagonal array, with a core diameter of approximately 26 μm, and a core pitch of approximately 39 μm. The cladding outer diameter is 125 μm and the outer diameter of the acrylate dual coating layer is 250 μm.

The average transmission loss of the seven individual MCF cores at 1.3 μm is approximately 0.5 dB/km, which is typical of conventional graded-index fiber. In order to achieve high-speed parallel MCF transmissions, e.g., greater than 10 Gb/s, it is necessary for there to be little or no crosstalk between the individual cores so that the transmitted signal at each core will not be subject to a significant amount of interference from signals transmitted at other cores. In addition, optimized design and precise control of graded-index profiles, with a suitable trench shape in each core during the fabrication process, are essential so that modal bandwidth can be increased, so that central and outer modes in each core can be precisely controlled. It is also important to perform fiber fabrication in such a way that deformation of the cores, especially the outer cores, can be eliminated. This can be accomplished using well-known methods depending on the method used to make the basic multicore fiber geometry, as described below.

The graded-index multi-core fiber can be fabricated using a stack-and-draw process. A preform is assembled containing a number of core rods positioned among a number of filler elements (rods, tubes, etc.). One way to hold the perform assembly together, for example, is to use an outer tube in which the rods are positioned. The preform is monitored during the fabrication process to ensure that the target fiber parameters are maintained. The geometric arrangement of the cores, the spacing among cores, and the core eccentricity are also monitored for quality control during the fabrication process.

Furthermore, the preform circumferences may be selectively etched by plasma, HF etching, mechanical grinding, or the like, such that upon fiber drawing, the core arrangement will achieve the desired target configuration. With proper positioning of the core rods and proper treatment (or elimination of) interstitial spaces between the rods, core deformation can be minimized. This can be accomplished by filling the interstitial spaces between core rods with solid filler rods or particles, by inserting the core rods into holes drilled in a uniform glass body, or by grinding the core rods into shapes which bundle together with minimal void space.

After the preform stack is assembled, it is heated, consolidated, and drawn into multicore fiber using techniques known in the art.

Figure 6:
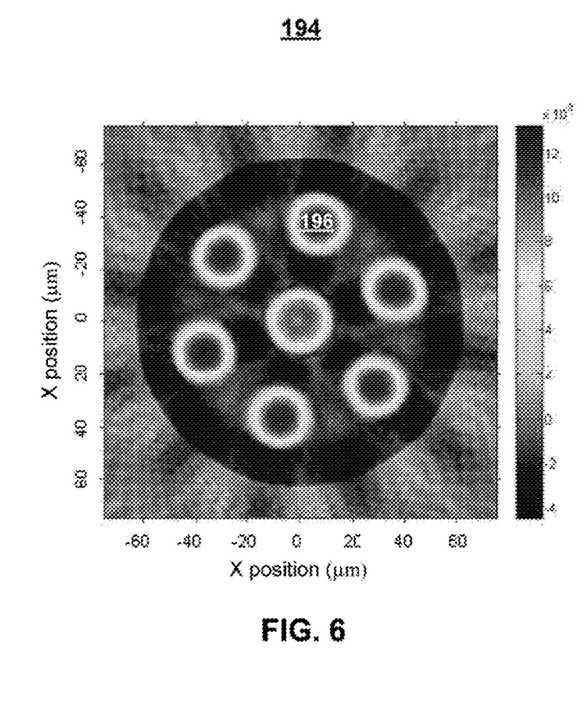
FIG. 6 shows a refractive index profile for the multicore fiber shown in FIG. 5, as measured by a tomographic index profiler.

FIG. 6 shows a refractive index profile 194 for the multicore fiber, as measured by a tomographic index profiler. The relative index difference is about 2%. It can be seen from FIG. 6 that all of the cores 196 are fairly circular and maintain an optimized graded-index profile.

The optical crosstalk from a signal core to an adjacent core is a significant issue in MCF design and manufacture. The crosstalk characteristics of a multicore fiber depend, in part, on fiber design features, such as refractive index profile, geometric structure, and the like. It also depends on other factors, such as fiber length, bending properties, and so on.

For the MCF described above, optical crosstalk from the center core to adjacent outer cores in a 550 m length of the fiber wound onto a reel having a diameter of 17 cm diameter was measured by scanning the optical power intensity distributions at the output endface of the fiber when the center core was excited by an 850 nm wavelength multimode VCSEL. The crosstalk between the six outer cores and the center core in 550 m fiber were all measured to be below −40 dB.

In order to enhance MCF connectivity, and to increase the coupling efficiency and spatial tolerance in butt-coupling between a multimode MCF and a 2D array of VCSEL/PIN detectors, a respective GRIN lens can also be fabricated on each individual core of the MCF. A MCF made from several core rods with a graded index profile will provide a plurality of GRIN lens within a compact device to provide interconnection between an MCF and a transceiver.

According to a further aspect of the invention, in order to preserve the orientation of the individual cores in an MCF, the MCF is provided with a marker to distinguish which core is connected to which transmitter. The marker can be implemented using a mechanical feature, such as a groove, flat surface, or the like, or an optical feature, such as an absorber, emitter, scatterer, refractor, or the like. The marker can serve as an indicator of orientation, or alternatively can mechanically produce a preferred orientation (e.g., a flat surface marker may prevent unwanted orientations during coupling).

2. CORE NETWORKS

A core network can be viewed as the backbone of a network architecture, and typically includes data links having lengths of hundreds or thousands of kilometers. In current optical core networks, LiNbO3 Mach-Zehnder (MZ) modulators with distributed feedback (DFB) lasers are normally used as the transmitters and high-speed PIN photodetector are used as the receivers.

The per-fiber capacity in optical core networks has increased at a rate of approximately 100 every 10 years, A total capacity of 32-Tb/s on a fiber using dense wavelength-division multiplexing (WDM) and polarization-division multiplexing (PDM) techniques was recently demonstrated in the research community, and transport capacity of several Tb/s are commercial available. It is expected that 100 Gb/s Ethernet will be deployed in the near future, and that operator carriers will need to be able to transport more than 100 Tb/s per fiber. However, recent studies have shown that capacity per fiber cannot reach 100 Tb/s per fiber using current transmission technologies. Thus, a "disruptive" innovation in fiber technology might be necessary to achieve the desired capacity, i.e., an innovation that causes far-reaching changes in the marketplace. It is proposed herein that one such disruptive innovation would be to use MCF with space-division multiplexing (SDM) for a core network.

There is now described a scheme, according to a further aspect of the invention, for using a tapered multicore connector (TMC) to perform SUM with single-mode MCF and to form SDM, WDM and PDM multispan MCF transmissions.

Figure 7:
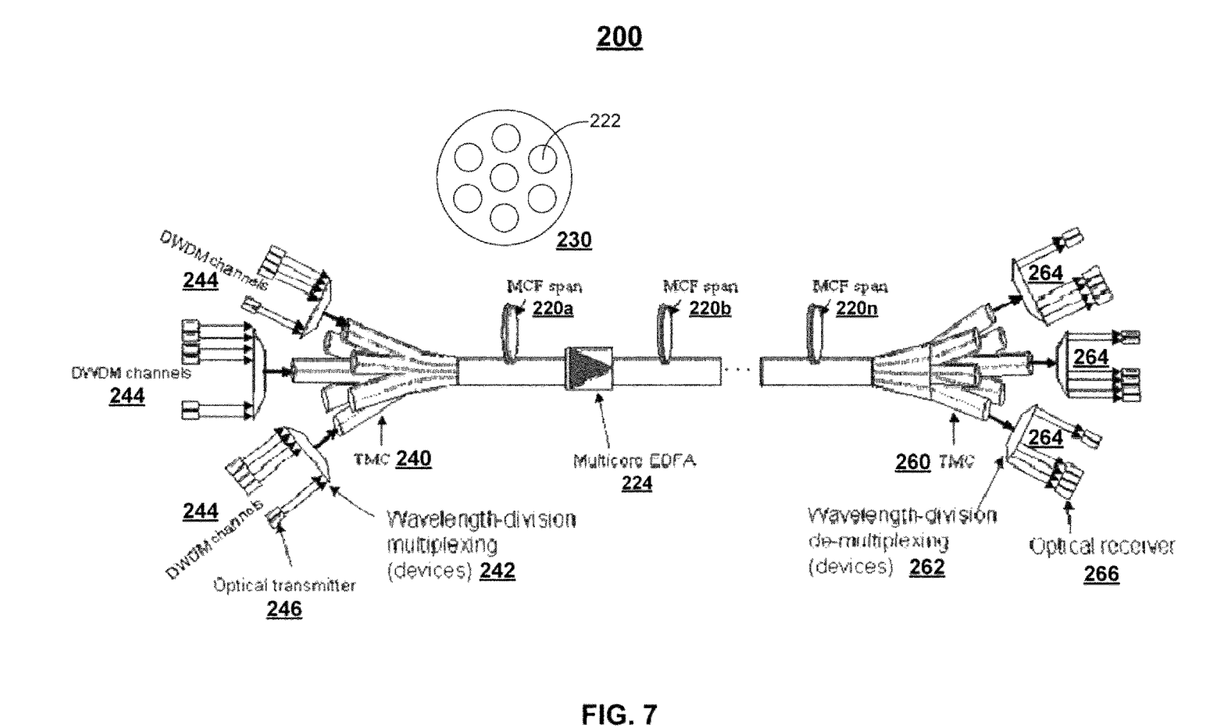
FIG. 7 shows a schematic diagram of a space-division multiplexed, wavelength-division multiplexed, multichannel, multispan transmission system according to an aspect of the invention.

FIG. 7 shows a schematic diagram of a SDM and WDM (or PDM) multispan transmission link 200, according to a further aspect of the invention. In transmission link 200, first and second tapered multicore connectors (TMCs) 240, 260 are used to connect, respectively, to multiplexing devices (e.g., WDMs or PDMs) 242 and corresponding demultiplexing devices (e.g., wavelength-division or polarization-division demultiplexers) 262 into and out of a series of spans of a single-mode MCF 240. After each span, a multicore optical amplifier 224 will typically be employed in order to compensate for transmission losses. Alternatively, distributed Raman amplification can be used to amplify the signal as it propagates along the fiber.

Transmission link 200 comprises a series of spans 220a-n of a 7-core single-mode MCF 220. Each span 220a-n is capable of simultaneous 7-core transmission over distances ranging from tens of kilometers to hundreds of kilometers. An exemplary cross section configuration of the MFC cores 222 is shown in inset 230.

A first TMC 240 is provided at the lead end of the first MCF span 220a to provide space-division multiplexing (SDM) and to provide connectivity to a plurality of wavelength-division or polarization-division multiplexing (WDM or PDM) optical devices 242, which are used to combine a number of transmitters 244 at different wavelengths or polarizations using known wavelength-division or polarization-division multiplexing techniques 242. A second TMC 260 is provided at the tail end of the last MCF span 220n, in order to provide space-division demultiplexing, and in order to provide connectivity to a plurality of wavelength-division or polarization-division demultiplexing (WDDM or PDDM) optical devices 262, which are used to demultiplex the wavelength or polarization channels 264, which are connected to a respective plurality of optical receivers 266.

As illustrated in FIG. 7, multicore amplifiers 224 can be placed between MCF spans 220a-n, in order to provide signal amplification. In the present example, multicore amplifiers 242 comprise rare-earth, e.g. erbium or erbium-ytterbium, doped fibers. Multicore Raman or parametric amplifiers can also be used for distributed or lump amplification. WDM couplers at both the launch and receiver ends can be used to provide pump light for optical amplification.

Figure 8:
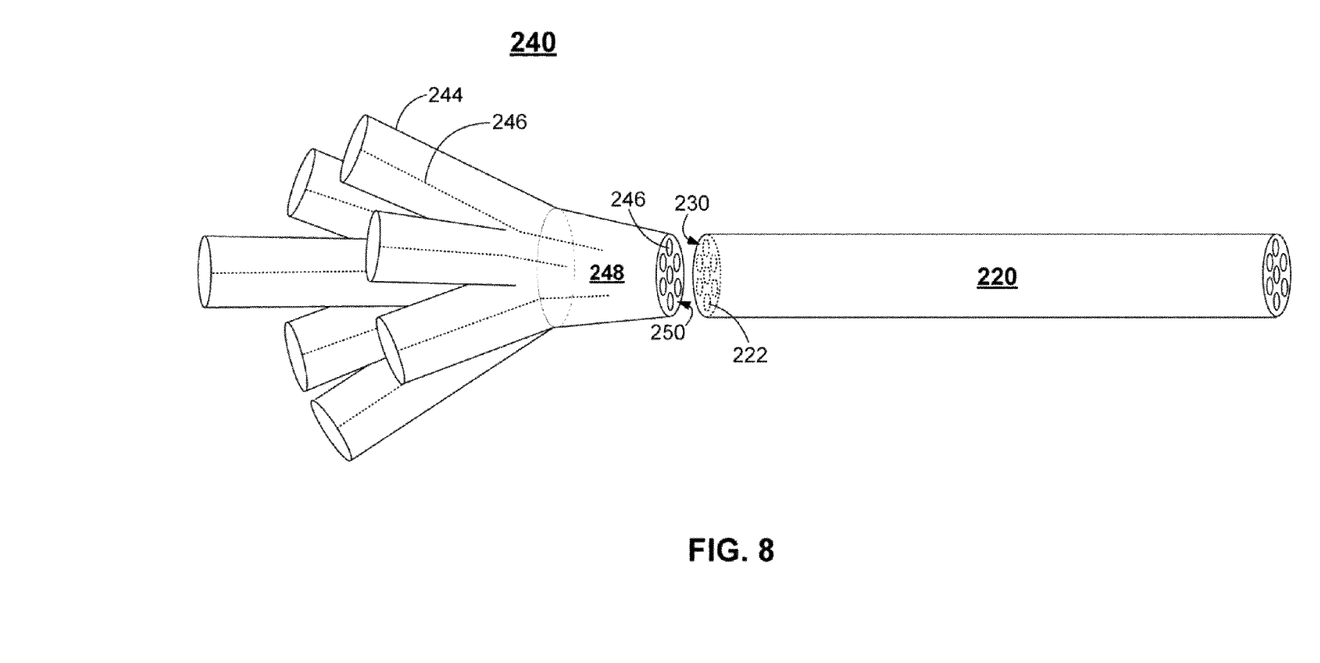
FIG. 8 shows a schematic diagram of a tapered multicore connector according to an aspect of the invention.

FIG. 8 shows a schematic diagram of a tapered multicore connector (TMC) 240 in greater detail. TMC 240 comprises a plurality of optical fibers 244, each fiber including a respective core 246 extending therethrough. The plurality of fiber 244 are joined together at a tapered coupler body 248 that maintains the separation the individual fiber cores 246 with an acceptably low level of crosstalk, e.g., less than −25 dB. Insertion loss from the TMC must also be kept as small as possible. The tapered coupler body 248 terminates at an endface 250.

In the present example, TMC 240 has an outer diameter that matches the outer diameter of endface 230 of an exemplary MCF 220. Further, TMC endface 250 has a core configuration that matches the configuration of the cores 222 of the multicore fiber 220, with respect to core diameter, core pitch, modefield size, modetield shape, and the like. The individual fibers 244 may be connected to respective wavelength-division or polarization-division multiplexing devices which can be used to multiplex (or demultiplex) the wavelength or polarization channels and are connected to either a number of optical transmitters or receivers, or like transmission devices. The coupler endface 250 is connected directly to MCF endface 230, with the coupler cores 246 aligned with respective MCF cores 222. The coupler and MCF endfaces are joined using a low-loss fusion splicing technique, or the like.

One advantage of the described TMC is that it can be used to perform a SDM function in a transmission link in combination with WDM or PDM devices, thus increasing transmission capacity in general.

Tapered multicore connectors, including fabrication techniques, are described in greater detail in U.S. Prov. Pat. App. Ser. No. 61/314,182, which is owned by the assignee of the present application, and which is incorporated by reference herein in its entirety.

It should be noted that the present invention differs from prior art devices, such as the tapered fiber bundle (TFB) shown in U.S. Pat. No. 5,864,644. One significant difference is that the presently described TMC is used to provide connectivity for a plurality of high-speed parallel data links, and thus preserves the integrity of multiple individual cores. A TFB, on the other hand, is used in an entire different application, i.e., to provide light energy to a cladding-pumped fiber laser, amplifier, or like device having a single core and a large cladding into which pumping light energy is launched. Thus, while a TFB may have a plurality of single-fiber inputs, it fails to maintain the integrity of multiple cores (that is, it does not provide low crosstalk) and cannot be used for parallel data transmission.

In some applications, such as long-haul, multispan transmissions, multicore amplifiers are needed, such as amplifier 224 shown in FIG. 7. Multicore fiber amplifiers are described in U.S. Prov. Pat. App. Ser. No. 61/314,181, which is owned by the assignee of the present application, and which is incorporated herein by reference in its entirety.

3. OPTICAL ACCESS NETWORKS

In an optical access network, a passive optical network (PON) architecture is commonly used, wherein an optical line terminal at the center office (CO/OLT) is connected to the remote node (RN) by means of an optical fiber having a length on the order of ~20-60 km and a passive optical splitter connected to optical network units (ONUS) at the subscriber premises. According to various standards, such as ITU-T, The upstream signal has a wavelength in the range of 1310 nm and the downstream signal has a wavelength in the range of 1490 nm. In an optical access network, directly modulated lasers (DMLs), electro-absorber modulated lasers (EMLs), or like devices, are commonly used as the transmitters; avalanche diode detectors, or like devices, are used as receivers.

Recent rapid growth of interne services has resulted in an increasing need for a large number of feed fibers, resulting in congestion in duct pipe lines. Hence, low-cost, high-fiber-count, high-density cables are necessary to construct practical PON systems for future optical access networks. MCF offers a solution to overcome the limitations imposed by current cable diameters. In order to resolve the congestion of large counts of feed fiber cables in duct pipe areas, single-mode MCF transmission can be used for PON systems.

Figure 9:
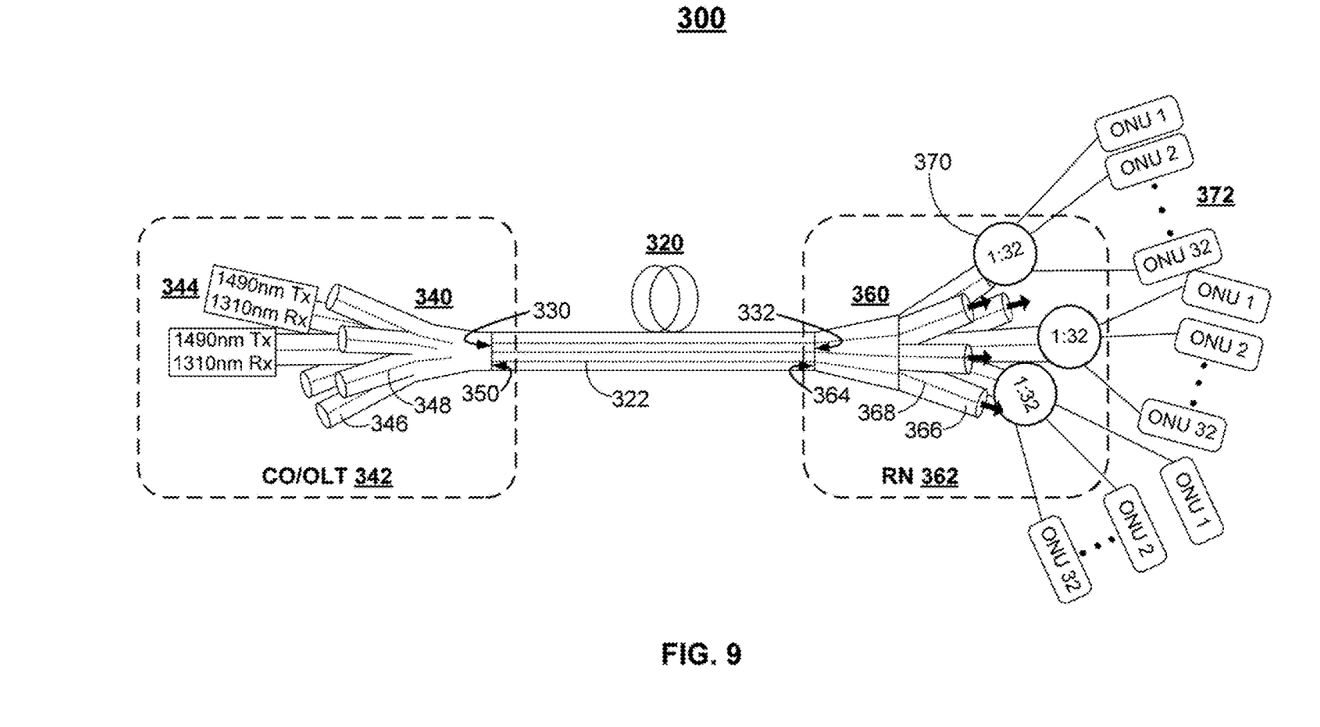
FIG. 9 shows a schematic diagram of an exemplary PON architecture according to an aspect of the invention.

FIG. 9 shows a schematic diagram of an exemplary PON architecture 300 according to an aspect of the invention, wherein a 7-core single-mode MCF 320 and first and second TMCs 340 and 360 are employed for simultaneous transmission of seven channels.

At a CO/OLT 342, a number of PON transceivers 344 (1490 nm downstream signal transmitter and 1310 nm upstream receiver) are connected to the first TMC 340 via a plurality of respective single-core fibers 346, each of which includes a respective core 348 extending therethrough. The first TMC endface 350 is connected, using fusion splicing or a like technique, to a first endface 330 of single-mode MCF.

At an RN 362, the endface 364 of second TMC 360 is connected, using fusion splicing or a like technique, to a second MCF endface 332 of MCF. Individual fibers 366, with respective cores 368 are joined together at the second TMC 360, with cores 368 extending separately to TMC endface 364. Fibers 366 are connected to respective optical fiber splitters 370. In the present example, the optical fiber splitters have a splitting ratio of 1:32. Each splitter is connected to ONUs 372 at the subscribers' premises.

4. SUMMARY

While the topologies and applications described above are distinct, the optical components comprising the network have commonality in several respects. Regarding the MCF, whether the cores are singlemode or carry multiple modes, the optical attenuation should not be significantly higher than comparable single-core fibers.

For single-mode MCF, the loss should not exceed 0.42 dB/km at 1310 nm, and should not exceed 0.3 dB/km at 1490 nm. For multimode MCF, the loss should not exceed 2.2 dB/km at 850 nm and 0.5 dB/km at 1300 nm. These loss levels are important for establishing an efficient communications link and loss budget. Achieving these loss levels requires attention to both core design and fabrication methods, as described in U.S. Prov. Pat. App. Ser. Nos. 61/312,497 and 61/314,184, owned by the assignee of the present application and incorporated by reference herein in their respective entireties. Similar attention to core and assembly properties is required to manage crosstalk between and among cores. In particular, the crosstalk in multimode MCF should be less than −40 dB in a 550 m length of fiber. The crosstalk in single-mode MCF should be less than −38 dB within the transmission wavelength window for an access network.

A second common feature is that the cores should have sufficient positional accuracy and precision in the size and shape of the optical modefield to enable facile splicing of fibers to assemble a concatenated cable span or to couple to input and output devices such as TMCs. This may require that the fiber have markers or features to enable one or more cores to be uniquely identified. Coupling loss into and out of the MCF must be sufficiently low to close the link budget. The acceptable level of crosstalk depends upon the particular application. In a typical access network, the crosstalk should be less than −25 dB. In a typical core network, the crosstalk should be less than −40 dB.

5. CONCLUSION

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

The invention claimed is:
1. An optical access network, comprising:
a plurality of passive optical network transceivers;
a plurality of optical splitters; and
a multichannel transmission link having a first end connected to the plurality of passive optical network transceivers and a second end connected to the plurality of optical splitters to form a plurality of parallel transmission channels therebetween,
wherein the multichannel transmission link comprises at least one span of a multicore fiber with a plurality of individual cores, and
wherein the multichannel transmission link comprises a multicore fiber span that is connected to the plurality of optical splitters by means of a tapered multicore coupler comprising a plurality of individual fibers having respective first ends joined together at a tapered coupler body,
wherein cores of the individual fibers extend through the tapered coupler body, terminating at an endface having a core configuration matching the configuration of the individual cores of the multicore fiber,
wherein the coupler endface is connected to the multicore fiber, and
wherein the individual fibers have respective ends connected to respective splitters in the plurality of optical splitters.

2. The optical access network of claim 1, wherein the multicore fiber is a single-mode multicore fiber.

3. The optical access network of claim 1,
wherein the plurality of passive optical network transceivers is connected to an end of a multicore fiber span means of a first tapered multicore coupler, and
wherein the plurality of optical splitters is connected to an end of a multicore fiber span by means of a second tapered multicore coupler.

4. The optical access network of claim 1,
wherein the plurality of passive optical network transceivers is configured as an array,
wherein the multichannel transmission link includes a span of a multicore fiber having a core configuration matching the array configuration of the plurality of passive optical network transceivers,
and wherein the multicore fiber span having the matching core configuration has an endface connected directly to the plurality of passive optical network transceivers, with the individual cores of the multicore fiber span aligned with respective transceivers in the plurality of passive optical network transceivers.

5. The optical access network of claim 1,
wherein the plurality of passive optical network transceivers comprises a plurality of passive optical network transceivers in an optical line terminal at a central office, and
wherein the plurality of optical splitters comprises a plurality of optical splitters at a remote node.

6. The optical access network of claim 5,
wherein the optical splitters at the remote node are connected to optical network units at subscribers' premises.

7. The optical access network of claim 5, wherein the plurality of passive optical network transceivers comprises 1490 nm downstream signal transmitters and 1310 nm upstream receivers.

\* \* \* \* \*